United States Patent [19]

Moore et al.

[11] 4,399,547
[45] Aug. 16, 1983

[54] RECEIVER OF PULSED PHASE MODULATED SIGNALS

[75] Inventors: Herbert E. Moore, Pasadena; Thomas E. Flanders, Houston, both of Tex.

[73] Assignee: General Electric Co., Philadelphia, Pa.

[21] Appl. No.: 317,117

[22] Filed: Nov. 2, 1981

[51] Int. Cl.³ .............................................. H03K 9/06
[52] U.S. Cl. ........................................ 375/83; 375/94; 340/310 A
[58] Field of Search ....................... 375/52, 78, 83, 84, 375/94, 95; 340/310 R, 310 A, 858; 329/110, 112; 328/55, 133, 155; 307/510, 511, 514

[56] References Cited

U.S. PATENT DOCUMENTS 3,959,767  5/1976  Smither et al. ...................... 340/858
4,311,964  1/1982  Boykin ................................... 375/83

Primary Examiner—Benedict V. Safourek
Assistant Examiner—Stephen Chin
Attorney, Agent, or Firm—Allen E. Amgott

[57] ABSTRACT

A receiver of pulsed phase modulated signals is disclosed. These signals are produced by switching a reactance on and off a power line. The receiver produces a sinusoidal current in phase with the current on the power line and a sinusoidal voltage nominally 90 degrees out of phase with the voltage on the power line. These sinusoids are multiplied together to produce a sinusoid of double the original frequency (which may be filtered out) and voltage levels (positive when the reactance is on line and negative when it is off). The absolute value difference between these voltage levels (if any) is used as an error voltage for feedback. The voltage sinusoid is modified by this feedback.

5 Claims, 1 Drawing Figure

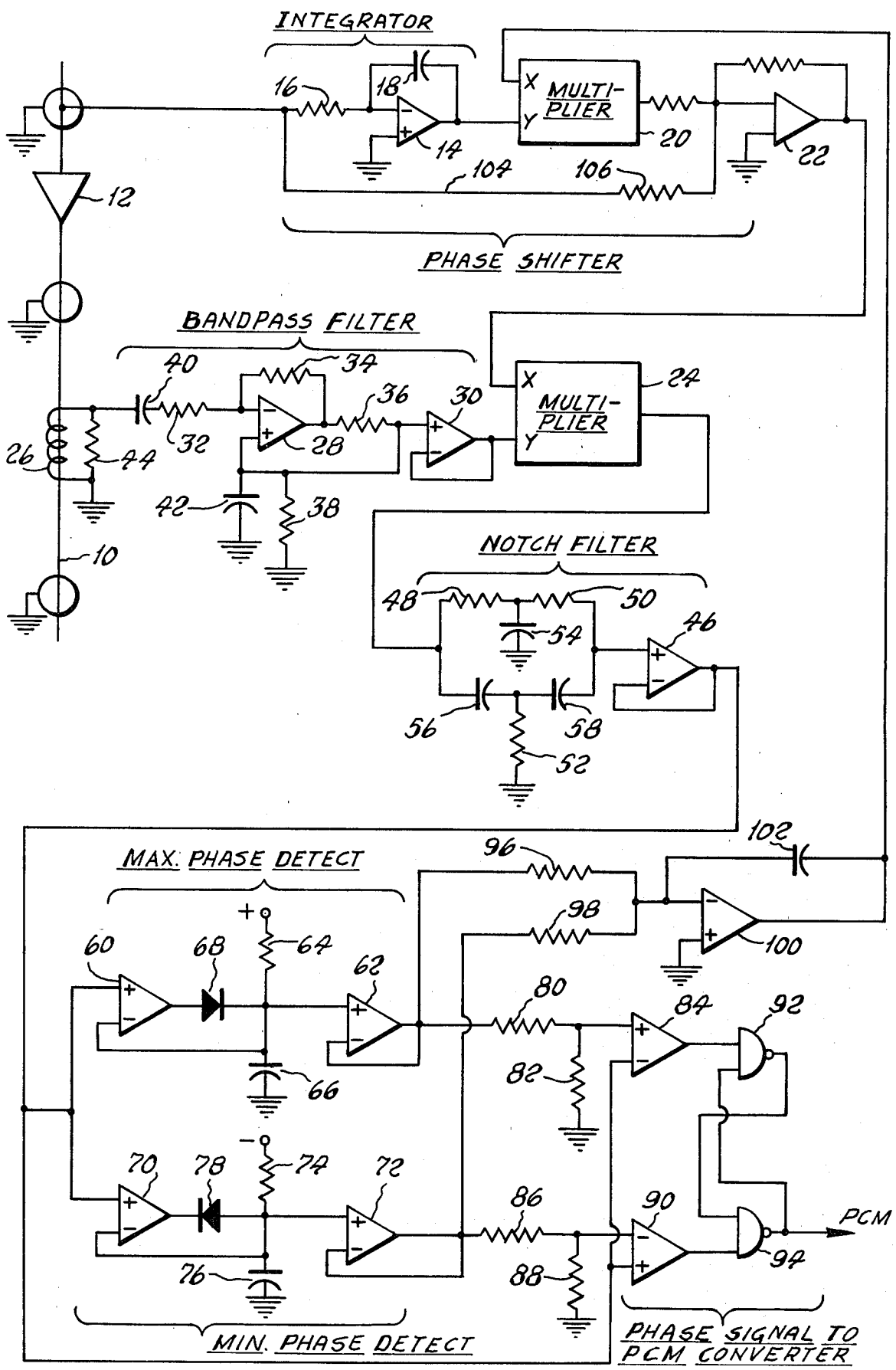

RECEIVER OF PULSED PHASE MODULATED SIGNALS

BACKGROUND OF THE INVENTION

This invention relates generally to transmission of data by modulation of the power factor of a power transmission line, and more particularly to an improved receiver for such data.

U.S. Pat. No. 3,959,767 to Smither et al describes a data transmission system for transmitting information from a well bore to the surface over the line carrying power down the well bore. By switching a reactance into the power line in the well bore, the phase angle between the voltage and current is modified. This power factor modulation is used to transmit, in a digital form, information, which is then detected and decoded at the surface.

In constructing and testing the invention of Smithers et al, a receiver was first used which measured the amplitude of the current at the times the voltage was zero (the zero crossings of the voltage). Errors were found to occur in the detected data which appear to result because of changes in the power factor as the length of the coaxial power line changed, and also because of noise which appeared to affect the zero crossings.

SUMMARY OF THE INVENTION

The receiver of pulsed phase modulated signals includes an error feedback loop to maintain positive and negative pulses at equal magnitudes (although opposite sign).

BRIEF DESCRIPTION OF THE DRAWINGS

The drawing is a schematic of a circuit in accordance with the invention.

DESCRIPTION OF THE PREFERRED EMBODIMENT

Referring to the drawing, cable 10 carries 1000 Hz power to the equipment in the well bore (not shown, nor a part of this invention). This power has a voltage and current which are essentially in phase with a supplied reference frequency and has been raised to a suitable voltage such as 115 volts by power amplifier 12. Included in the well bore equipment is a transmitter which continuously sends signals over cable 10 by switching a reactive (capacitive) load onto and off cable 10. Each time this switching occurs, the phase angle of the cable current with respect to the cable voltage is changed. When the capacitance is switched in, a "1" is transmitted, and when it is switched out, a "0" is transmitted. This power factor modulation is the same approach previously used.

The power factor on the line with the capacitance switched out (i.e. unmodulated) is not constant and therefore is not readily predictable because the line itself has a capacitance which changes as the line length changes. In addition, the load typically has a reactance which changes. The change in power factor produced by switching in the capacitance is not large and might be mistaken if not for the circuitry of this invention.

To accentuate the phase changes which occur as the capacitance is switched on and off the line, a closed loop is used.

The reference frequency is connected to an integrator consisting of operational amplifier 14, resistor 16 and capacitor 18. Capacitor 18 is selected to have a short enough time constant so that the output of amplifier 14 is a voltage shifted from the reference by 90°. This sinusoidally changing voltage is applied to the "Y" terminal of multiplier 20. The "X" terminal of multiplier 20 has applied to it a direct current voltage which changes in magnitude in a manner to be described later. The direct current voltage applied at the "X" terminal of multiplier 20 changes the amplitude of the sinusoidal voltage applied at the "Y" terminal. The output of multiplier 20 is added to the unshifted sinusoidal reference carried by line 104 in summing amplifier 22. The sum is a sinusoid which is out of phase with the reference voltage by an amount which depends upon the amplitudes of the two waves being summed.

Current transformer 26 on cable 10 has its output current filtered to a clean sinusoid by a band pass filter having amplifiers 28 and 30, resistors 32–38 and capacitors 40 and 42. This sinusoidal current is delivered to the "Y" terminal of multiplier 24. It is noted that resistor 44, across current transformer 26, is made to be small so any phase shifting of the current through current transformer 26 is minimal. Since cable 10 is delivering power to the well bore, the volage and current of this power are essentially in phase. Thus, multiplier 24 is receiving at its X and Y terminals two sinusoids of the same frequency but essentially 90° apart. The output of multiplier 24 has a direct current component which is in the form of positive or negative pulses. A positive pulse or "1" is produced when the capacitance is switched on the line downhole, and a negative pulse or "0" is produced when the capacitance is switched off the line. Multiplier 24 also has an alternating current signal output of double the frequency of the reference frequency (since $\sin 2\pi f \cos 2\pi f = \frac{1}{2} \sin 4\pi f$).

The double frequency output of multiplier 24 is removed by a notch filter comprising amplifier 46, resistors 48–52, and capacitors 54–58.

The DC pulses produced at the output of multiplier 24 pass through the notch filter. If these pulses are positive, it is an indication that the voltage leads the current in phase on cable 10, whereas if the voltage lags the current the pulses will be negative. The amplitude of the pulses determines the amount of phase shift between the voltage and current waves. (If the voltage and current are in phase, no DC component will be produced by multiplier 24.).

The DC pulses which pass through the notch filter are fed to phase detectors. The phase detectors produce a DC output, the magnitude of which is representative of the phase shift. If the phase shift is positive, this DC level will be positive whereas if it is negative the DC level will be negative. The maximum phase detector comprises amplifiers 60 and 62, resistor 64, capacitor 66 and diode 68. The minimum phase detector comprises amplifiers 70 and 72, resistor 74, capacitor 76 and diode 78. As each pulse is applied to the phase detector, capacitor 66 or 76 (depending upon the polarity of the pulse) is charged to the level of the pulse. Resistors 64 and 74 allow these charges to bleed off before the next pulse so that the capacitors are repeatedly charged to the present level of the pulses.

The DC levels produced by the phase detectors are divided by resistors. In the case of the maximum phase detector, resistors 80 and 82 divide this positive DC level and the positive output is fed to the positive terminal of comparator 84. In the case of the minimum phase detector the negative DC level is divided by resistors 86 and 88 and this negative DC level is fed to the negative terminal of comparator 90. The DC pulses which are produced by the notch filter also are fed around the phase detectors and applied to the negative terminal of comparator 84 and the positive terminal of comparator 90. Both comparators 84 and 90 will produce negative pulses; however, only comparator 84 will produce these pulses when the phase shift is positive and only comparator 90 will produce these pulses when the phase shift is negative. Flip flops 92 and 94 receive the outputs of comparators 84 and 90 and produce the pulse code modulated output which is the desired signal transmitted from the well bore.

The DC levels which are produced by the phase detectors as outputs from amplifiers 62 and 72 are also delivered to resistors 96 and 98 respectively with the difference being integrated in the integrator comprising amplifier 100 and capacitor 102. This phase difference signal is fed to the "X" input of multiplier 20. If the DC levels are equal (although of opposite sign) no phase difference signal is produced.

Although a particular embodiment of a circuit and method for receiving pulsed phase modulated signals has been shown and described, it will be obvious that changes and modifications can be made without departing from the spirit of the invention and the scope of the appended claims.

We claim:

1. A receiver of pulsed phase modulated signals carried by an alternating power line comprising:
   an integrator for receiving a sinusoidal voltage reference in phase with the voltage on the power line and for producing a sinusoidal voltage, phase shifted 90 degrees;
   a first multiplier having as one input said phase shifted voltage and as a second input a direct current voltage representative of the deviation of signals processed from a desired average;
   said first multiplier producing said phase shifted voltage modified in amplitude;
   a summing amplifier having as an input both the output produced by said multiplier and the sinusoidal voltage reference;
   said summing amplifier producing a corrected sinusoidal voltage output;
   a current transformer producing a sinusoidal current in phase with the current on said power line;
   a second multiplier having as a first input said corrected sinusoidal voltage, and as a second input said sinusoidal current;
   said second multiplier producing a direct current pulse of a maximum amplitude when a reactance is switched onto said power line and a minimum amplitude when said reactance is switched off said power line;
   integrating means receiving and integrating the difference between said maximum and minimum direct current pulses and for producing the direct current voltage to be supplied to said first multiplier; and
   detecting means for receiving said maximum and minimum amplitude pulses and producing a pulse code modulated output.

2. A receiver of pulsed phase modulated signals in accordance with claim 1 further including:
   a notch filter in circuit with said second multiplier for removing the double frequency sinusoidal component also produced by said second multiplier.

3. A receiver of pulsed phase modulated signals in accordance with claim 1 further including:
   a bandpass filter in circuit with said current transformer for smoothing the sinusoidal current produced by said current transformer.

4. A receiver of pulsed phase modulated signals in accordance with claim 1 wherein:
   said detecting means includes maximum and minimum phase detectors.

5. A method of detecting pulsed phase modulated signals carried by an alternating power line comprising:
   producing a sinusoidal current in phase with the current on said power line;
   producing a sinusoidal voltage nominally 90 degrees out of phase with the voltage on said power line;
   multiplying said sinusoidal current and said sinusoidal voltage together to produce a direct current pulse of a maximum amplitude when a reactance is switched onto said power line, and of a minimum amplitude when said reactance is switched off said power line;
   integrating the difference between said maximum and minimum direct current pulses to produce a error direct current voltage;
   feeding said error direct current voltage back to modify said sinusoidal voltage; and
   converting said maximum and minimum direct current pulses to a pulse code modulated output.

* * * * *